United States Patent Office 3,426,593
Patented Feb. 11, 1969

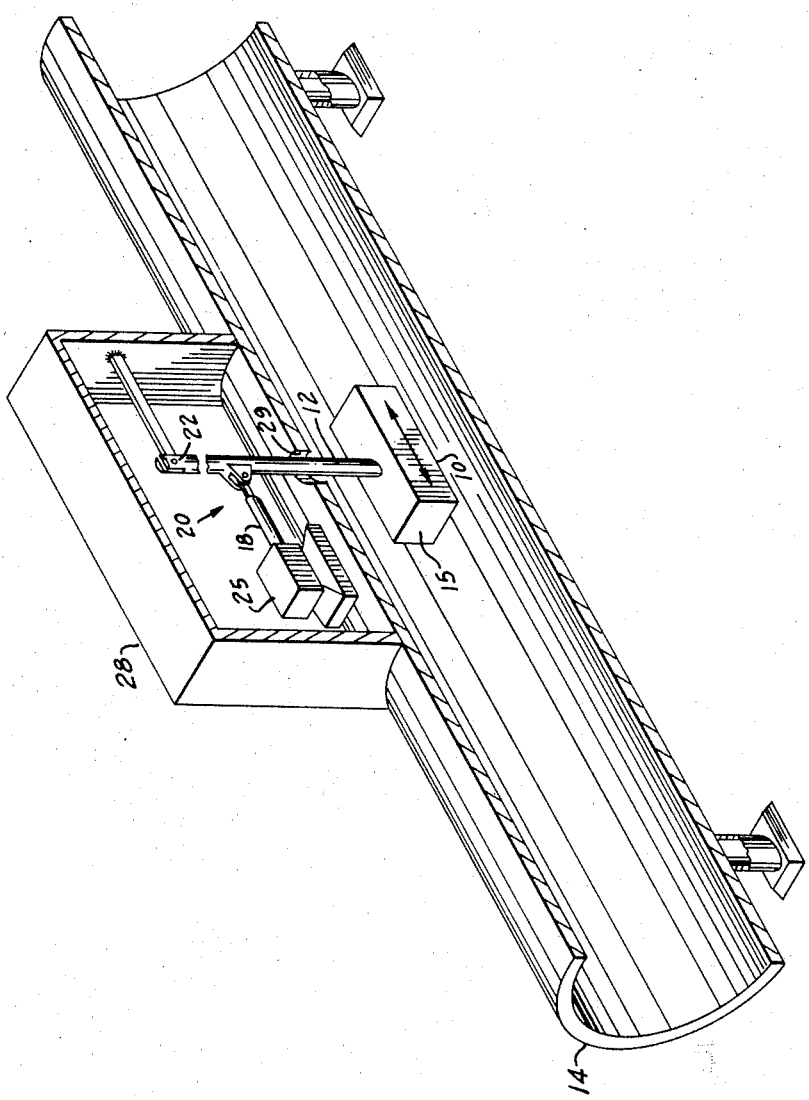

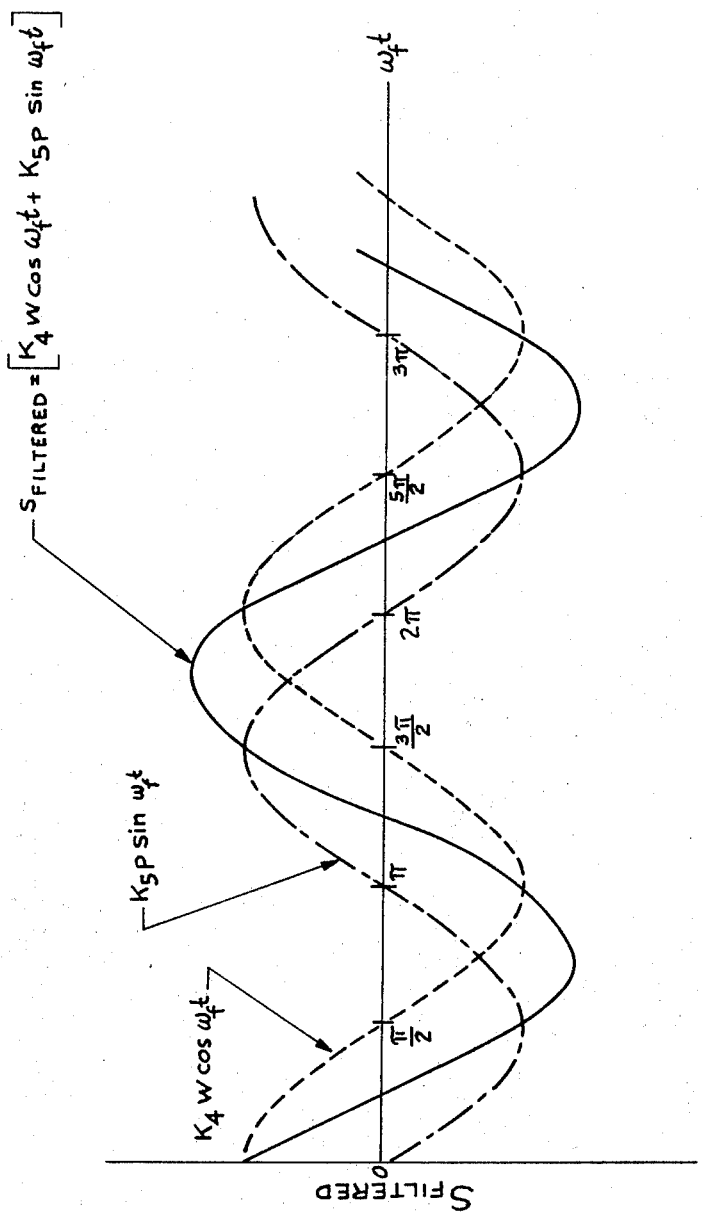

3,426,593
VIBRATING TRANSDUCER FOR FLOW AND RELATED MEASUREMENTS
Robert B. Jacobs, 840 Park Lane,
Boulder, Colo. 80302
Filed Dec. 23, 1965, Ser. No. 515,877
U.S. Cl. 73—194
Int. Cl. G01f 1/00; G01n 11/10, 9/10
8 Claims

ABSTRACT OF THE DISCLOSURE

The flow characteristics of a fluid system are measured by vibrating a transducer longitudinally of a conduit through which the fluid to be measured flows. The transducer is vibrated at a selected frequency and the resultant pressure or force exerted by the fluid on the transducer produces an electrical signal. The in-phase and out-of-phase components of the transducer signal are isolated and the output indications therefrom provide a measure of mass flow rate, density, and volumetric flow rate.

---

Figure 1:
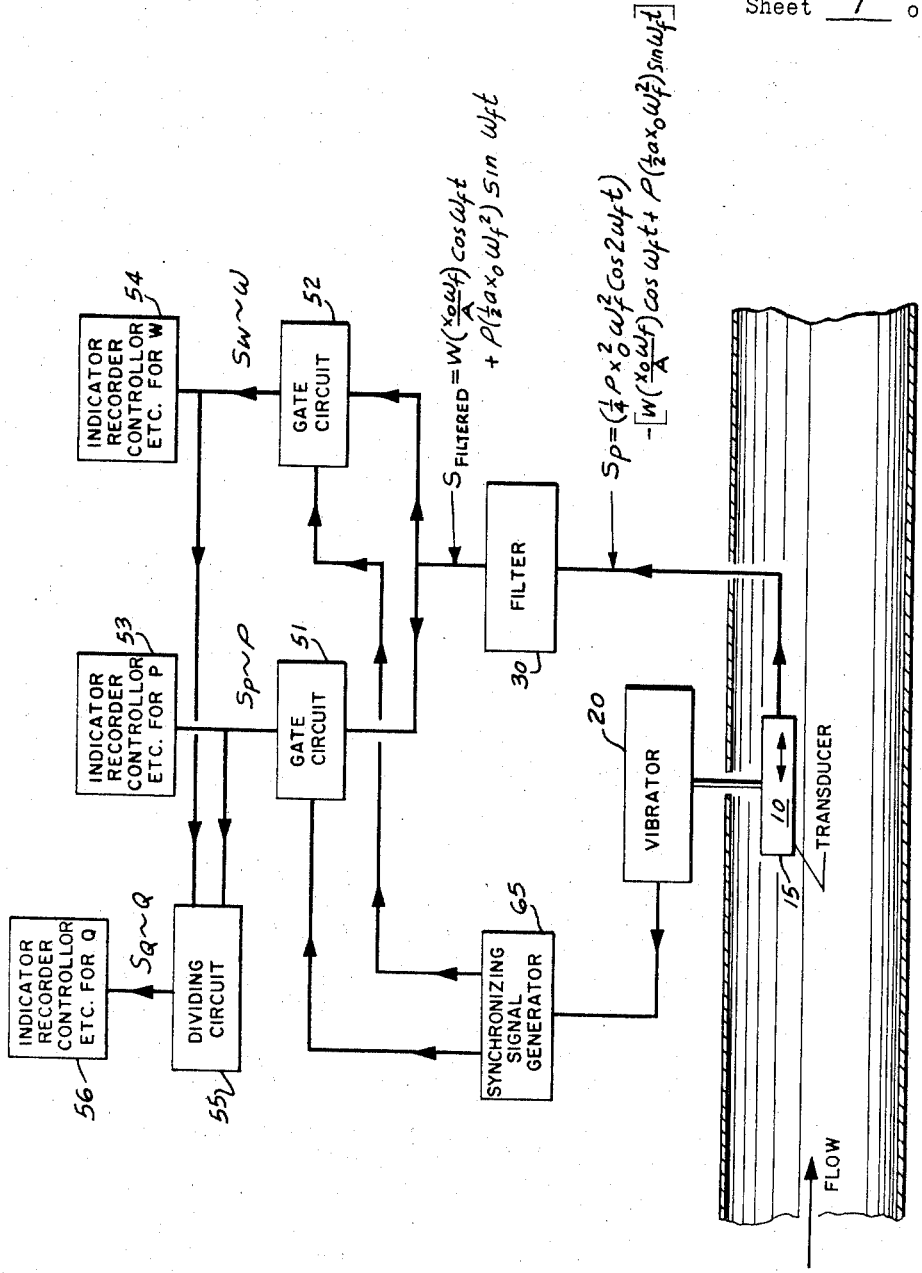

The present invention relates generally to fluid flow measurement systems and relates more particularly to a new and improved system for measuring dynamic characteristics of a fluid flow system such as the mass flow rate, the volumetric flow rate and/or the instantaneous density of the fluid.

Flow meters have long been used extensively in various measuring and control systems. In a simplified form, these flow meters may consist of a rotor inserted into the fluid flow so that the volumetric flow rate is measured as a function of the angular velocity of the rotor. Measurement of the volumetric flow rate can often be achieved rather simply, but measurement of the mass flow rate produces a considerably more difficult problem. The mass flow rate not only varies as a function of the volumetric flow rate, but also varies as a function of the density of the fluid. The mass flow rate divided by the volumetric flow rate is the density of the fluid. In systems where the density has a tendency to vary, a measure of the mass flow rate and the instantaneous density of the fluid in addition to the volumetric flow rate is of considerable importance.

All of the mass flow measurement devices previously developed have had serious shortcomings, making them unsuitable or completely unsatisfactory for many applications.

It is therefore an object of this invention to provide a novel fluid flow measurement system.

Another object of this invention is to provide a novel fluid flow measurement system for measuring mass flow rate, density, and volumetric flow rate and having highly improved measuring characteristics and capabilities over previously known devices.

Another object of this invention is to provide a novel fluid flow measurement system for measuring mass flow rate, density, and volumetric flow rate capable of measuring a greatly increased range of mass flow rates and densities, including lower mass flow rates and less dense fluids.

Another object of this invention is to provide a novel fluid flow measurement system for measuring flow rate, density and volumetric flow rate having increased overall accuracy, greater reliability, and greater simplicity.

Another object of this invention is to provide a novel fluid flow measurement system for measuring mass flow rate, density, and volumetric flow rate capable of measuring compressible and complex fluids.

Another object of this invention is to provide a novel fluid flow measurement system for measuring mass flow rate, density, and volumetric flow rate having increased sensitivity, resolution, and frequency response.

Another object of this invention is to provide a novel fluid flow measurement system for measuring mass flow rate, density, and volumetric flow rate which does not require expensive or complex detection mechanisms.

Another object of this invention is to provide a novel fluid flow measurement system including only a single measuring instrument for measuring mass flow rate, density, and volumetric flow rate comprising a vibrating transducer whose pressure or force sensitive area is in direct contact with the fluid to be measured.

Another object of this invention is to provide a novel fluid flow measurement system for measuring mass flow rate, density, and volumetric flow rate including a vibrating transducer capable of operation under a high frequency of vibration so as to increase sensitivity, accuracy, resolution, frequency response, and other desirable measuring characteristics of the system.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations and improveemnts herein shown and described.

In accordance with this invention, the principle by which the mass flow rate and density can be measured in a dynamic system is based upon Newton's second law of motion which, briefly stated, indicates that acceleration of a particle is directly proportional to the resultant external forces acting on the particle and inversely proportional to the mass of the particle. Thus, if a known motion is imparted to particles in the fluid system, and the force creating that motion is measured, then indications related to the mass and flow of the fluid can be determined.

Briefly described, the present invention comprises mounting a pressure or force transducer within a conduit through which there is flowing a fluid whose mass rate of flow, density and/or volumetric rate of flow is to be measured. The transducer is oriented within the conduit so that pressure, or force, sensitive area is normal to the longitudinal axis of the pipe and, hence, fluid flow. The radial position of the transducer within the conduit is selected so as to maximize the range of flow rates over which the invention may be accurately and simply used. The transducer support is connected with suitable vibrator means for vibrating the transducer in a direction parallel to the longitudinal axis of the fluid conduit. Vibration of the transducer subjects the pressure or force sensitive area to the pressure exerted by the fluid as a result of the translational force impulses applied thereto. The pressure experienced by the transducer is converted into an electrical signal which, together with a signal synchronized with the translational motion applied to the transducer, is fed through appropriate electronic circuitry so as to produce signals proportional to each of the mass rate of flow, density and volumetric rate of flow of the fluid in the conduit.

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

Of the drawings:

FIGURE 1 is a diagrammatic illustration of a vibrating transducer fluid flow measurement system embodying the present invention;

FIGURE 2 is a schematic isometric view of a physical embodiment of the vibrating transducer system represented by FIGURE 1, the fluid conduit and vibrator housing being broken away to show the vibrating transducer support structure; and FIGURE 3 is a graphical representation of a typical signal (solid line) produced after the signal from the transducer has passed through a filtering circuit, as well as the signals representing mass flow rate (dotted line) and density (dot-dash line).

Referring now more particularly to the embodiment of the invention shown in the accompanying drawings, there is illustrated a transducer, designated generally by reference numeral 10, positioned by means of a support rod 12 within a pipe or conduit 14 through which there is flowing from a supply zone to a receiving zone a fluid whose mass rate of flow, density and/or volumetric rate of flow is to be measured.

Transducer 10 is oriented within conduit 14 so that the pressure, or force, sensitive area 15 is normal to the longitudinal axis of conduit 14 and, hence, normal to the direction of fluid flow therein. Where, as shown in the accompanying drawings, the pressure, or force, sensitive area 15 is normal to the longitudinal axis of the transducer 10, the transducer is oriented so that its longitudinal axis is parallel to the longitudinal axis of conduit 14.

The radial position of transducer 10 in the conduit 14 is important in maximizing the range of flows over which the device can be accurately used. When proper consideration is given to this position and to the Reynolds number range for which the system is to be designed, the flow-rate range over which a given design will be extremely accurate can be very large. For example, an error of less than 0.1 percent will occur over a flow-rate range of 50 to 1 if the transducer is located at 0.76 the distance from the tube axis to the tube wall and the Reynolds number is in the $10^6$ to $10^7$ range.

In accordance with the invention, vibrator means, indicated generally by reference numeral 20, is provided for vibrating transducer 10 in a direction parallel to the longitudinal axis of conduit 14. To this end, as more specifically illustrated in FIGURE 2, transducer support 12 is connected to a vibrator, indicated generally by reference numeral 25, by linking member 18 and is mounted for movement about pivot 22 in response to the translational forces applied by vibrator 25 through linkage 18. Vibrator 25 may suitably comprise a conventional power source, including a motor, transmission and clutch, rotating a shaft so as to drive a Scotch yoke which in turn causes axial reciprocation of linkage 18 and, consequently, imparts essentially a translational vibratory motion to transducer 10 in a direction parallel to the longitudinal axis of conduit 14.

It will be understood to those of ordinary skill in the art that the vibrator means 20 may be mechanical, electromechanical, pneumatic, hydraulic, etc., and, depending upon the application, can be located inside conduit 14, on the outside thereof, or may be mounted in spaced relationship thereto. As embodied in FIGURE 2 herein, vibrator means 20 may be enclosed in a housing 28 attached to conduit 14. Housing 28 may be welded to the conduit or suitably flanged so that there will be no fluid leakage from the housing to the environment. Transducer support 12 may then pass through opening 29 in conduit 14 so as to communicate the inside of the conduit with the inside of the housing; the latter is thus exposed to the fluid flowing in the conduit. This arrangement eliminates the necessity for providing a seal through which the vibrating support must pass. It will be understood, however, that where the housing is spaced from the conduit, such a seal would be necessary and may suitably constitute a metal bellows, elastomeric tubing such as rubber or plastic, a metal diaphragm, an elastomeric diaphragm, or other suitable means.

While it is not intended to predicate patentability on any particular theory, it is believed that the motion imposed upon transducer 10 by vibrator means 20 is essentially sinusoidal, and can be expressed by the mathematical relationship "$x_o \sin(\omega_f t)$", and that the pressure (or force) "$p$" exerted by the fluid flowing in conduit 14 on the pressure, or force, sensitive area 15 of the transducer may be expressed by the mathematical relationship:

$$p = \overbrace{(p_o + \tfrac{1}{2}\rho V^2)}^{\text{I}} + \overbrace{(\tfrac{1}{4}\rho x_o^2 \omega_f^2)}^{\text{II}} + \overbrace{(\tfrac{1}{4}\rho x_o^2 \omega_f^2 \cos 2\omega_f t)}^{\text{III}} - \overbrace{\left[w\left(\frac{x_o \omega_f}{A}\right)\cos \omega_f t + \rho(\tfrac{1}{2}ax_o\omega_f^2)\sin \omega_f t\right]}^{\text{IV} \quad \text{V}}$$

(Eq. 1)

where:

$p_o$ is the static pressure existing in the fluid.
$\rho$ is the effective density of the fluid.
$V$ is an average axial velocity of the fluid.
$x_o$ is the amplitude of the vibratory motion imposed upon the transducer.
$\omega_f$ is the frequency of the vibratory motion imposed upon the transducer.
$t$ is time.
$w$ is mass rate of flow.
$A$ is an effective cross-sectional area of the flow.
$a$ is an effective linear dimension of the upstream end of the transducer.

The quantities on the right-hand side of Equation 1 have been separately identified as terms I–V. As more fully explained hereinbelow, for the purposes of this invention, terms I, II and III are considered to be parasitic and are to be eliminated. Terms IV and V are the ones which are of interest: the amplitude of term IV is proportional to the mass rate of flow and the amplitude of term V is proportional to the fluid density.

Term I is considered a steady-state term inasmuch as its time variation is independent of $\omega_f$, and depends only upon changes in the fluid flow. It is parasitic for the reasons that it is not a useable function of the variables involved in fluid flow measurement; it is a function of the static pressure ($p_o$) in the system such that any device which is sensitive to it would have to be pressure compensated; and its magnitude is much greater than the magnitudes of the other terms. If this term were included in the pressure that produces the signal in the transducer, the overall device would be very inaccurate since the range of the transducer would have to be very large compared with those portions of the signal which are responsive to the fluid flow variables.

Term II may also be considered as a steady-state quantity inasmuch as it changes in time only insofar as the fluid density $\rho$ changes in time. In many situations its magnitude is small compared with those of terms IV and V, often being less than one percent. In those situations where accuracy specifications will tolerate it, this term can be ignored.

The magnitude of term III is the same as that of term II; however, it varies at the first harmonic frequency $2\omega_f$. Both of the terms II and III are good measures of density and could form the basis for densitometers. However, as term V is much larger, its use is preferable. As previously indicated for term II, under some circumstances the presence of term III can be ignored. In general, for high accuracy, it should be eliminated. Again, this is done by incorporating a suitable circuit in the electronic circuitry that filters out signals of frequency $2\omega_f$.

In the preferred form of the invention, terms I and II are eliminated by selecting a transducer 10 which is insensitive to steady state or static pressures. The electrical signal ($S_p$ in FIGURE 1) produced by transducer 10 therefore includes only components related to the terms III, IV and V. The output of transducer 10 is passed through an electrical filter circuit 30 which is constructed to eliminate the first harmonic frequency $2\omega_f$ thereby eliminating the term III. Hence, only the useful terms IV and V remain in the electrical signal.

The selected transducer must be sensitive to pressure fluctuations at the frequency $\omega_f$ but insensitive to the normal low frequency fluctuations in the flow rate of the system and to the static pressures of the system. The piezoelectric pressure transducer fulfills these requirements and many models are commercially available which operate very satisfactorily. In addition, miniature models are available, permitting application of the invention to relatively small systems. A suitable commercially available transducer is the Kistler model 601 miniature piezoelectric, having a natural frequency of 150,000 c.p.s., manufactured by Kistler Instrument Corporation, Clarence, N.Y.

Transducers other than piezoelectric can be employed, and in some instances are preferable because of their greater sensitivity. However, these transducers are normally responsive to static pressures and therefore terms I and II of the Equation 1 must be eliminated by other techniques. Since term I is a function of the static pressure it can be eliminated by preloading or biasing the system to cancel out this static component. The electric filter circuit 30 should then be an electric band pass filter tuned to the frequency $\omega_f$. Such a filter will eliminate not only the second harmonic $2\omega_f$ in component III, but will also attenuate the nonalternating components like I and II. Satisfactory commercially available transducers utilize strain gauge, potentiometer, variable reluctance, and variable capacitance principles. Examples of such suitable commercially available transducers are model PB 301A, manufactured by Data Sensors, Inc. (a bonded strain gauge having a natural frequency of 1700 c.p.s. and above) and model P7D, manufactured by the Pace Engineering Company (a variable reluctance transducer having a natural frequency of 5,000 c.p.s. and above).

The range of vibration frequencies of the transducer employed will be between about 10 c.p.s. and a few hundred c.p.s. The actual choice of frequency depends upon many factors, some of which are: the fluid density range, the fluid velocity range, the amplitude of vibration, sonic velocity in the fluid, the desired magnitude of the signal, the possibility of designing around the need for an electronic filter, the desired frequency response of the device, the desirability of a multirange device, whether the device is to be a mass flowmeter, a densitometer, a volumetric flowmeter, or some combination of these factors. In any event, however, it will be seen from the foregoing examples that the natural frequencies of commercially available transducers are very high relative to the vibration frequencies required to be used to produce an electrical signal response to fluid flow measurable quantities.

Since the natural frequencies of the transducers are appreciably greater than the frequencies of interest in the signal, no undesirable resonance effects will be encountered.

After leaving filter circuit 30, the signal ($S_{Filtered}$ of FIGURE 1) consists of terms IV and V of Equation 1 as follows:

$$S_{Filtered} = \overbrace{w\left(\frac{x_0\omega_f}{A}\right)\cos\omega_f t}^{IV} + \overbrace{\rho(\tfrac{1}{2}ax_0\omega_f{}^2)\sin\omega_f t}^{V}$$

(Eq. 2)

FIGURE 3 is a graphical representation of the signal represented by the relationships of Equation 2. Term V, because of the factor "$\sin \omega_f t$," is the in-phase component of the electrical signal and is shown as a dot-dash line. The amplitude of the in-phase component is $\rho(\tfrac{1}{2}ax_0\omega_f{}^2)$, or in other words, is a constant $K_5$ times the density $\rho$ of the fluid. Term IV, because of the factor "$\cos \omega_f t$" is the out-of-phase component, shown in dotted lines, and is displaced from the in-phase component by 90 degrees. The amplitude of the out-of-phase component is $$w\left(\frac{x_0\omega_f}{A}\right)$$

or in other words, a constant $K_4$ times the mass flow rate $w$. Therefore, by separating the in-phase component from the out-of-phase component in the electrical signal $S_{Filtered}$, and by measuring the respective amplitudes, indications are obtained which are proportional to the instantaneous density of the fluid and the mass flow rate.

Any suitable phase detecting system can be used for comparing the electrical signal emerging from filter 30 with a synchronizing signal obtained from the vibrator means 20 to thereby obtain a measure of the in-phase and out-of-phase component magnitudes. For purposes of illustration, a sampling type phase detector system is shown. In FIGURE 3, it will be seen that the in-phase signal is zero at times $0, 2\pi, 4\pi, \ldots$ etc., whereas the out-of-phase signal is zero at times $-\pi/2, 3\pi/2, 7\pi/2 \ldots$ etc. Accordingly, if the composite electrical signal $S_{Filtered}$ is sampled, or "looked at," at a time when the in-phase signal is zero, the magnitude of the sample pulse is equal to the amplitude of the out-of-phase component. Furthermore, if the samples are taken at times $0, 2\pi, 4\pi, \ldots$ etc., all of the output pulses are of the same polarity. Likewise, if the composite signal is sampled when the out-of-phase signal is zero, the magnitude of the resulting sample pulses are equal to the amplitude of the in-phase component, and if taken at times $-\pi/2, 3\pi/2, 7\pi/2 \ldots$ etc., the sample pulses will all be of the same polarity.

The sampling phase detector includes a pair of electrical gate circuits 51 and 52 coupled to the output of electrical filter circuit 30 to receive the composite signal $S_{Filtered}$. A synchronizing signal generator 65 is coupled between the vibrator means 20 and the gate inputs of circuits 51 and 52. Alternatively, the necessary synchronizing signals may be derived mechanically or electrically from the vibrator means 20.

A simple synchronizing signal generator involves the use of a conventional magnetic proximity pickup and is preferably used in the present invention. Briefly, in the proximity pickup concept, a piece of magnetic material is placed on one of the moving parts of the vibrator. An induction coil is mounted on a stationary part in a position where the magnetic material can come close enough to it to induce a potential in the coil. This potential is the synchronizing signal. The magnetic material and the coil are placed, relative to each other, so that they come into proximity at the time intervals which will generate the induced signal at the above specified times.

Alternatively, a slotted-disc photocell arrangement may be used wherein a light source shines on the active material of a photocell. Between the light and the cell a shutter device is provided which will permit the light to impinge upon the cell at the specified times for generating the synchronizing signal. The shutter device is preferably actuated by the vibrator; for example, if the vibrator has a rotating shaft, the shutter can be a disc which rotates with the shaft and which has a hole in it to permit transmission of the light at the specified time.

Gate circuits 51 and 52 are designed to permit an electrical signal applied to the input thereof to pass through whenever a signal is simultaneously applied to the gate input. Gate circuit 51 provides a measure of fluid density which in turn is related to the amplitude of the in-phase component. Therefore, signal generator 65 is constructed to provide short pulses which open gate 51 when the out-of-phase signal is zero, i.e., at times $-\pi/2, 3\pi/2, 7\pi/2 \ldots$ etc. The resulting output pulses appearing at the output of gate circuit 51 are applied to a suitable output circuit 53 which can be a measuring instrument or a recorder. Where desired, a circuit can be connected between the gate circuit and the output circuit to fill in between successive output pulses and thereby provide a more continuous output signal.

Gate circuit 52 provides a measure of the mass flow rate which in turn is proportional to the amplitude of the out-of-phase component. Therefore, the signal generator is designed to provide a series of pulses to operate gate circuit 52 at times when the in-phase signal is zero, i.e., times 0, $2\pi$, $4\pi$, . . . etc. The pulses appearing at the output of gate circuit 52 have an amplitude proportional to the mass flow rate and are supplied to a suitable output circuit 54 which provides a visible indication or is utilized as part of external control equipment.

Since volume is equal to the mass divided by density, the volumetric flow rate can be determined by dividing the mass flow rate by the corresponding instantaneous density of the fluid. Accordingly, the outputs from gate circuits 51 and 52 are supplied to a divider circuit 55 and thereafter to another output circuit 56 which can be a recorder, measuring instrument, or part of an external control system. Divider circuit 55 can be of conventional design as used in analog computers and is preferably preceded by circuits for converting pulse outputs from the gate circuits into relatively smooth analog signals.

The invention in its broader aspects is not limited to the specific embodiments herein shown and described but departures may be made therefrom within the scope of the accompanying claims, without departing from the principles of the invention and without sacrificing its chief advantages.

What I claim is:

1. In a system for measuring flow characteristics of a fluid system, the combination of: a transducer for providing an electrical signal proportional to pressure; a conduit for carrying fluid past said transducer; means for vibrating said transducer longitudinally of said conduit at a selected frequency; electrical circuit means connected to said transducer and responsive to said electrical signal for isolating the in-phase and out-of-phase components in said signal at said frequency; and output means which measures the mass flow rate of said fluid by indicating the magnitude of said out-of-phase component of said signal.

2. In a system for measuring flow characteristics of a fluid system, the combination of: a transducer for providing an electrical signal proportional to pressure; a conduit for carrying fluid past said transducer; means for vibrating said transducer longitudinally of said conduit at a selected frequency; electrical circuit means connected to said transducer and responsive to said electrical signal for isolating the in-phase and out-of-phase components in said signal at said frequency; and output means which measures the volumetric flow rate of said fluid by indicating the dividend of the magnitude of said out-of-phase component of said signal divided by the magnitude of said in-phase component of said signal.

3. In a system for measuring flow characteristics of a fluid system, the combination of: a transducer for providing an electrical signal proportional to pressure; a conduit for carrying fluid past said transducer; a synchronizing signal source for providing an electrical signal at a selected frequency; means responsive to said synchronizing signal vibrating said transducer longitudinally of said conduit at said selected frequency; electrical circuit means connected to said transducer and said synchronizing signal source, said electrical circuit means responsive to said synchronizing and transducer signals for isolating the in-phase and out-of-phase components in said transducer signal relative to said synchronizing signal at said selected frequency; and output means which measures the density of said fluid by indicating the magnitude of said in-phase component and measures the mass flow rate of said fluid by indicating the magnitude of said out-of-phase component.

4. The system as claimed in claim 3, wherein said transducer is mounted in said conduit so that a pressure sensitive face thereof is normal to the direction of fluid flow and in direct contact therewith.

5. The system as claimed in claim 3, wherein said transducer is located in said conduit at 0.76 the distance from the conduit axis to the conduit wall when the Reynolds number of the fluid flow is between $10^6$ and $10^7$.

6. In a system for measuring mass flow characteristics of a moving fluid system, the combination of: a transducer for providing an electrical signal proportional to pressure; said transducer being positioned in said fluid system so that a pressure sensitive face thereof is normal to the direction of fluid flow and in direct contact therewith; means vibrating said transducer longitudinally of said conduit at a selected frequency to thereby impose known translational force impulses on said moving fluid system, said transducer sensing the pressure variations exerted by said moving fluid as a result of said force impulses being applied thereto and producing an electrical signal proportional to said pressure variations, and electrical circuit means connected to said transducer responsive to said transducer electrical signal, said electrical circuit means including first means rejecting undesired portions of the transducer signal and passing only those portions of the signal which are indicative of the pressure variations occurring in said moving fluid system due to said known force impulses, and indicator means operatively connected with said first means for indicating a mass flow characteristics of the moving fluid in accordance with changes in the passed portion of the transducer signal.

7. A system as claimed in claim 6, wherein said transducer is of a type nonresponsive to static pressure, and a filter circuit is connected to the output of said transducer to eliminate the first harmonic from said electrical signal.

8. A system as claimed in claim 6, including an electrical band pass filter circuit connected to the output of said transducer and tuned to pass only said selected frequency.

References Cited

UNITED STATES PATENTS

| | | |
|---|---|---|
| 2,943,476 | 7/1960 | Bernstein. |
| 3,138,955 | 6/1964 | Uttler. |
| 3,251,226 | 5/1966 | Cushing. |

RICHARD C. QUEISSER, *Primary Examiner.*

EDWARD GILHOOLY, *Assistant Examiner.*

U.S. Cl. X.R.

73—61.1, 32

UNITED STATES PATENT OFFICE
CERTIFICATE OF CORRECTION

Patent No. 3,426,593                                February 11, 1969

Robert B. Jacobs

It is certified that error appears in the above identified patent and that said Letters Patent are hereby corrected as shown below:

Column 1, line 62, "measuring flow" should read -- measuring mass flow --. Column 2, line 24, "improveemnts" should read -- improvements --. Column 4, lines 11 and 12, the portion of the equation reading $$[w(\overbrace{\frac{x_0 \omega f}{A} \cos \omega_f t}^{IV}$$

should read $$[w(\overbrace{\frac{x_0 \omega f}{A}}^{IV}) \cos \omega_f t$$

Column 4, line 23, and column 6, line 7, "w", each occurrence, should be italicized. Column 5, line 63, that portion of the formula reading $$(\frac{x_0 \omega f}{A})$$

should read $$(\frac{x_0 \omega f}{A})$$

Signed and sealed this 31st day of March 1970.

(SEAL)
Attest:

EDWARD M. FLETCHER, JR.                        WILLIAM E. SCHUYLER, JR.
Attesting Officer                                       Commissioner of Patents